US012754792B2

(12) United States Patent
Raszka et al.

(10) Patent No.: US 12,754,792 B2
(45) Date of Patent: Oct. 6, 2026

(54) SYSTEM AND METHOD FOR PRIORITIZING CODE VIOLATIONS USING MACHINE LEARNING AND DATASETS OF VULNERABLE AND VANILLA CODE SNIPPETS

(71) Applicant: PARASOFT CORPORATION, Monrovia, CA (US)

(72) Inventors: Leszek Jerzy Raszka, Czechowice Dziedzice (PL); Mariusz Woloszyn, Warsaw (PL)

(73) Assignee: PARASOFT CORPORATION, Monrovia, CA (US)

( * ) Notice: Subject to any disclaimer, the term of this patent is extended or adjusted under 35 U.S.C. 154(b) by 0 days.

(21) Appl. No.: 18/952,700

(22) Filed: Nov. 19, 2024

(65) Prior Publication Data

US 2025/0225014 A1 Jul. 10, 2025

Related U.S. Application Data

(60) Provisional application No. 63/618,854, filed on Jan. 8, 2024.

(51) Int. Cl.

| | |
|---|---|
| ***G06F 11/00*** | (2006.01) |
| ***G06F 11/07*** | (2006.01) |
| ***G06F 11/30*** | (2006.01) |
| ***G06F 11/3604*** | (2025.01) |
| ***G06F 21/50*** | (2013.01) |
| ***G06F 21/57*** | (2013.01) |

(52) U.S. Cl.
CPC ...... *G06F 11/0766* (2013.01); *G06F 11/3604* (2013.01); *G06F 21/577* (2013.01); *G06F 2221/033* (2013.01)

(58) Field of Classification Search
CPC ............. G06F 11/3604; G06F 11/0766; G06F 21/577; G06F 21/12
See application file for complete search history.

(56) References Cited

U.S. PATENT DOCUMENTS

| | | | | |
|---|---|---|---|---|
| 12,591,686 B2 * | 3/2026 | Ben Salem | ............. | G06F 21/54 |
| 2020/0137126 A1 * | 4/2020 | Yawalkar | ............ | H04L 63/1408 |
| 2020/0358802 A1 * | 11/2020 | Viswambharan | ..... | G06F 9/5072 |
| 2021/0256426 A1 * | 8/2021 | Calvano | ............... | G06N 3/0499 |

(Continued)

*Primary Examiner* — Philip Guyton
*Assistant Examiner* — Sean Kevin Mcnamara
(74) *Attorney, Agent, or Firm* — Womble Bond Dickinson US LLP

(57) ABSTRACT

Method for prioritizing code violations in a computer program, using machine learning includes: analyzing the computer program for code violations; extracting code snippets containing violations from the computer program; training a machine learning model to differentiate between vulnerable and non-vulnerable code in the extracted code snippets; inputting the extracted code snippets to a trained machine learning model to assign a vulnerability probability score to each snippet, wherein each vulnerability probability score indicates a severity of the violation for a respective snippet; ranking the code snippets based on their respective vulnerability probability score, wherein a higher score indicates a higher likelihood of causing severe vulnerabilities; and displaying the ranked code snippets to be fixed for their code violations.

20 Claims, 4 Drawing Sheets

(56) References Cited

U.S. PATENT DOCUMENTS

| | | | | |
|---|---|---|---|---|
| 2023/0169170 | A1* | 6/2023 | Yaron | G06F 21/577<br>726/1 |
| 2023/0252162 | A1* | 8/2023 | Kulshreshtha | G06F 21/577<br>726/25 |
| 2024/0119161 | A1* | 4/2024 | Alibrahim | G06F 21/10 |

* cited by examiner

SYSTEM AND METHOD FOR PRIORITIZING CODE VIOLATIONS USING MACHINE LEARNING AND DATASETS OF VULNERABLE AND VANILLA CODE SNIPPETS

CROSS-REFERENCE TO RELATED APPLICATIONS

This Patent Applications claims the benefits of U.S. Provisional Patent Application Ser. No. 63/618,854, filed on Jan. 8, 2024, and entitled "System and Method for Prioritizing Code Violations Using Machine Learning and Datasets of Vulnerable and Vanilla Code Snippets," the entire content of which is hereby expressly incorporated by reference.

FIELD

The present disclosure relates to software development and cybersecurity. More specifically, it pertains to a system and method for prioritizing code violations using machine learning and datasets of vulnerable and vanilla code snippets.

BACKGROUND

In software development, identifying and fixing code violations is a critical task. However, the severity of these violations can vary significantly, and addressing minor bugs while leaving dangerous errors unattended can lead to severe consequences. Existing methods for prioritizing code violations often lack the ability to differentiate between minor and severe violations, leading to inefficient use of developer resources and potential security risks. Therefore, there is a need for a system that can prioritize the most critical violations for correction.

Code violations refer to cases where the code fails to follow coding standards, best practices, or security rules that have been put in place. These violations can show up as defects, performance problems, or security gaps that have the potential to negatively impact the function, dependability, or safety of the software application. Detecting and resolving violations is a vital part of the software development lifecycle, as it helps guarantee that the end product delivered is high-quality, secure, and performs efficiently. By adhering to established guidelines and addressing any violations, developers can create robust and reliable software that meets functionality, security, and efficiency needs.

Code violations, even if similarly classified across different methods, can vary significantly in their severity. Identifying and fixing the most critical violations in the code before addressing benign mistakes is crucial for several reasons. Primarily, it ensures the efficient use of valuable developer time. Developers are a key resource in any software project, and their time is best spent addressing issues that have a significant impact on the functionality, security, or performance of the application. Fixing minor bugs while leaving dangerous errors unattended can lead to severe consequences, including system crashes, data breaches, or other security issues. These can result in substantial financial losses, damage to the company's reputation, and even legal repercussions, injury or death in critical application. Therefore, prioritizing the most important violations not only optimizes the use of developer time but also mitigates potential risks associated with severe software defects.

SUMMARY

In some embodiments, the present disclosure is directed to a method for prioritizing code violations in a computer program, using machine learning. The method includes: analyzing the computer program for code violations; extracting code snippets containing violations from the computer program; training a machine learning model to differentiate between vulnerable and non-vulnerable code in the extracted code snippets; inputting the extracted code snippets to a trained machine learning model to assign a vulnerability probability score to each snippet, wherein each vulnerability probability score indicates a severity of the violation for a respective snippet; ranking the code snippets based on their respective vulnerability probability score, wherein a higher score indicates a higher likelihood of causing severe vulnerabilities; and displaying the ranked code snippets to be fixed for their code violations.

In some embodiments, the present disclosure is directed to a system for prioritizing code violations in a computer program, using machine learning. The system includes: means for analyzing the computer program for code violations; means for extracting code snippets containing violations from the computer program; means for training a machine learning model to differentiate between vulnerable and non-vulnerable code in the extracted code snippets; means for inputting the extracted code snippets to a trained machine learning model to assign a vulnerability probability score to each snippet, wherein each vulnerability probability score indicates a severity of the violation for a respective snippet; means for ranking the code snippets based on their respective vulnerability probability score, wherein a higher score indicates a higher likelihood of causing severe vulnerabilities; and means for displaying the ranked code snippets to be fixed for their code violations.

In some embodiments, the present disclosure is directed to a tangible storage medium for storing computer codes, the computer codes when executed by one or more computers performing a method for prioritizing code violations in a computer program, using machine learning. The method includes: analyzing the computer program for code violations; extracting code snippets containing violations from the computer program; training a machine learning model to differentiate between vulnerable and non-vulnerable code in the extracted code snippets; inputting the extracted code snippets to a trained machine learning model to assign a vulnerability probability score to each snippet, wherein each vulnerability probability score indicates a severity of the violation for a respective snippet; ranking the code snippets based on their respective vulnerability probability score, wherein a higher score indicates a higher likelihood of causing severe vulnerabilities; and displaying the ranked code snippets to be fixed for their code violations

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

DETAIL DESCRIPTION

The present disclosure provides a system and method for prioritizing code violations using machine learning and datasets of vulnerable and vanilla code snippets. In some embodiments, the system trains a machine learning (ML) model on a dataset containing two types of code snippets: "vulnerable" and "vanilla" code snippets to prioritize code violations that differentiates coding errors that can potentially lead to serious vulnerabilities. "Vulnerable" code snippets are past coding errors that have caused security issues, while "vanilla" code snippets are clean code samples without any flaws. The model assigns a "vulnerability probability" score to each code snippet to help prioritize the most critical issues for correction. This score measures the code snippet's similarity to verified vulnerability-causing mistakes, thus it helps prioritize the most critical issues for correction. The present disclosure thus provides a more efficient and effective method for prioritizing code violations, optimizing the use of developer resources, and enhancing the security of software applications.

The disclosure also describes a systematic approach to creating the "vulnerable" and "vanilla" datasets. In some embodiments, the vulnerable dataset is created from GitHub commit hashes found in the Common Vulnerabilities and Exposures (CVE) dataset that provides a reference method for publicly known information-security vulnerabilities and exposures, while the "vanilla" dataset is created from open-source projects using static analysis tools, such as Parasoft's™ Jtest™, dotTEST™ and C/C++Test™ to analyze the code and filter out any functions or methods with violations.

As known in the art, similar to saving a file that's been edited, a "commit" records changes to one or more files in a code branch. Git assigns each commit a unique ID, called a SHA or hash, that identifies the specific changes, when the changes were made, and who created the changes. When a commit is made, a commit message that briefly describes the changes must be included.

Figure 1:
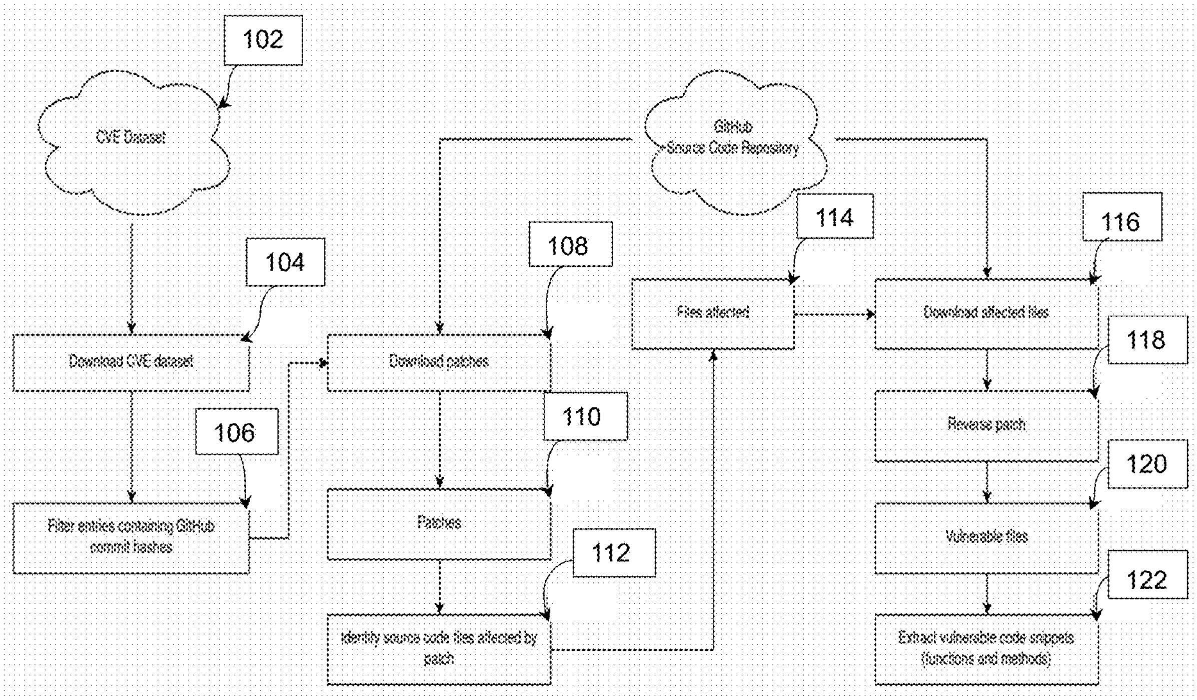
FIG. 1 shows an exemplary process for vulnerable dataset creation, according to some embodiments of the disclosure.

FIG. 1 shows an exemplary process for vulnerable dataset creation, according to some embodiments of the disclosure. The process is a systematic approach to creating a dataset of vulnerable functions or methods, for example, from GitHub commit hashes found in the Common Vulnerabilities and Exposures (CVE) dataset. The process is designed to identify, extract, and compile a comprehensive dataset of vulnerable functions or methods for further analysis or use in cybersecurity applications. In some embodiments, to create a vulnerable code snippets dataset a Common Vulnerabilities Exposures dataset obtained from National Vulnerability Database is being processed.

As shown in FIG. 1, the process downloads a CVE dataset 102, in block 104. Each entry in the dataset includes a unique CVE identifier (also called "CVE name", "CVE number", "CVE-ID", and "CVE"), a description of the vulnerability, its potential impact, and references to related reports and advisories. In block 106, the entries containing GitHub commit hashes are filtered. In some embodiments, this filtering process includes filtering the CVE dataset to identify entries that contain GitHub commit hashes. A commit hash is a unique identifier generated for each commit, or change, made to a repository. These hashes are used to track and reference specific changes made in the codebase. By filtering these hashes, specific code changes related to the vulnerabilities listed in the CVE dataset are identified.

In block 108, the corresponding patches 110 for the relevant identified commit hashes are downloaded. A patch is a set of changes to a computer program, or its supporting data designed to update, fix, or improve it. This includes fixing security vulnerabilities and other bugs. By downloading these patches, the changes that were made are identified to address the vulnerabilities. In block 112, source code files 114 that were affected by each patch are identified. This includes analyzing the patch details like added, removed and changed code lines to determine which files were changed as part of the vulnerability fix.

Once the affected files have been identified, they are downloaded, in block 116. These files contain the code that was changed as part of each patch, and thus, they do not contain the code that was vulnerable before the patch was applied. In block 118, each patch on the downloaded files is reversed. By reversing the patch, the files can be restored to their pre-patch state to reveal the vulnerable code that was present before the patch was applied. In block 120, vulnerable files are determined. After the patch has been reversed, the files are now in their vulnerable state. These files contain the code identified as a code violation or security risk, which needs to be patched.

In block 122, vulnerable code snippets (functions and methods) are extracted from the vulnerable files. This process includes identifying and isolating the functions and methods that were changed by the patch, where the code snippets represent the vulnerable portions of the codebase.

This process provides a systematic and efficient method for identifying, extracting, and compiling a dataset of vulnerable code from the CVE dataset and GitHub commit hashes. This dataset can be a valuable resource for cybersecurity research and development.

Figure 2:
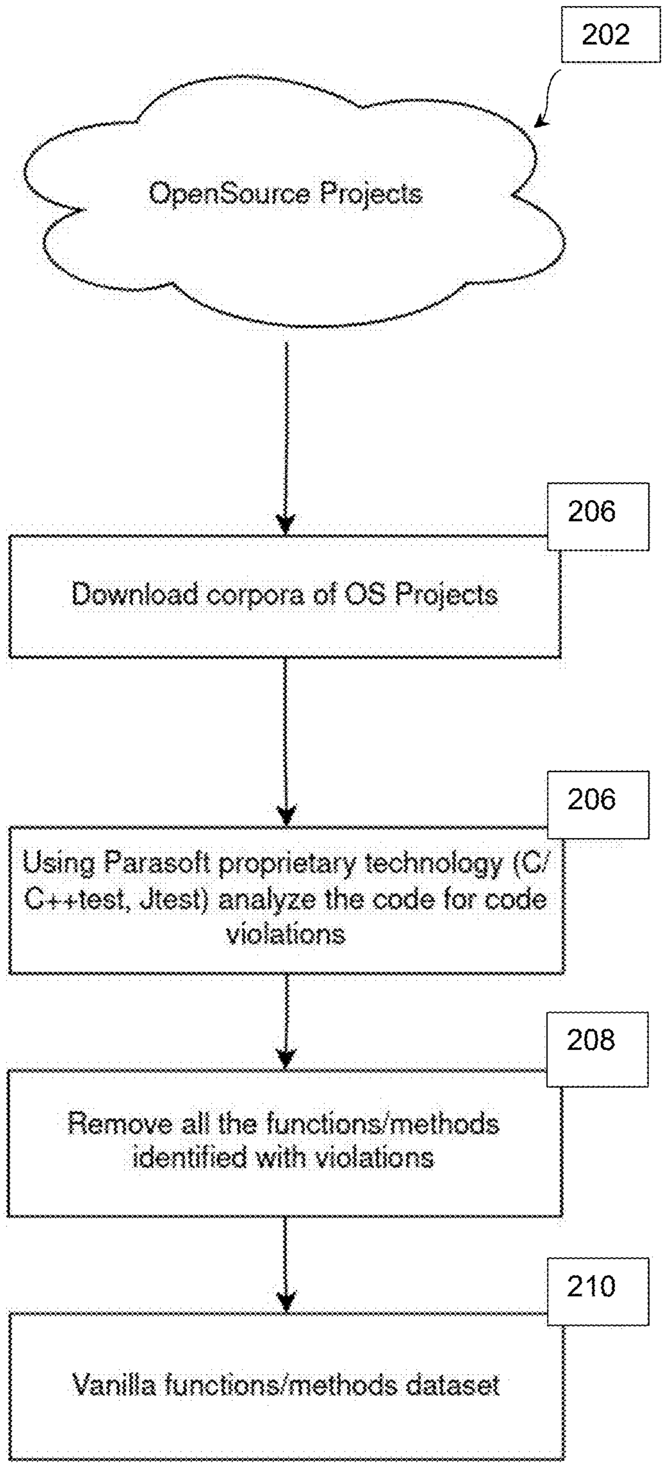
FIG. 2 depicts an exemplary process for vanilla dataset creation, according to some embodiments of the disclosure.

FIG. 2 depicts an exemplary process for vanilla (non-vulnerable) dataset creation, according to some embodiments of the disclosure. The exemplary process is a systematic approach to creating a dataset of vanilla functions or methods, i.e., those that do not contain any code violations, from Open-Source (OS) projects 202. The process leverages static analysis tools to analyze the code and filter out any functions or methods with violations.

As shown in block 204, corpora of Open Source (OS) projects are downloaded from an OS project. In some embodiments, this process includes aggregating codebases, libraries, or repositories of software that have been publicly shared and can be accessed freely. The process benefits from the wide variety of available code, spanning diverse functionalities, architectures, and implementations. Given the public nature of these projects, the corpora are a rich source of both well-constructed and potentially flawed code samples.

In block 206, the process analyzes the code for code violations using code violation testing tools. For example, Parasoft™ C/C++Test™, Jtest™ and dotTest™ are automated software testing tools that are designed to identify code violations. These tools are capable of detecting a wide range of issues, including coding standard violations, potential security vulnerabilities, and other types of defects. The analysis process includes scanning the codebase of each project in the corpora and identifying any functions or methods that contain violations.

In block 208, the process removes all the functions/methods identified with violations. Following the above detailed analysis in block 206, any functions or methods that have been identified as having violations are removed from the dataset. This sub-process ensures that the final dataset is free from tainted or potentially problematic code. By extracting these non-compliant segments, the process refines the corpus to contain only those functions or methods that adhere strictly to the coding standards and are void of the detected violations.

In block 210, the process creates vanilla (non-vulnerable) functions and/or methods dataset. This dataset includes only the functions or methods that do not contain any code violations during the analysis process. It represents a clean, compliant, and standardized codebase.

The above process depicted in FIG. 2 provides a systematic and efficient method for creating a dataset of "vanilla" functions or methods from open-source projects. By leveraging code violation testing tools, the process ensures that the resulting dataset is of high quality and free of code violations.

Figure 3:
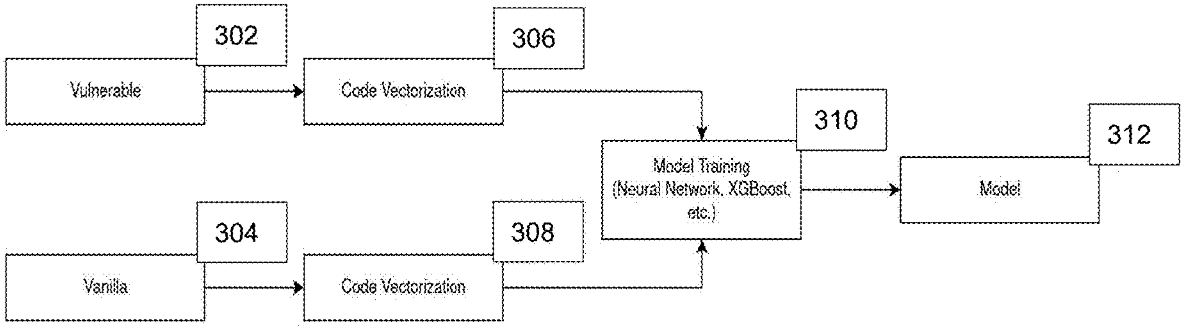
FIG. 3 illustrates an exemplary process for machine learning training to create a machine learning model, according to some embodiments of the disclosure.

FIG. 3 illustrates an exemplary process for machine learning training to create a machine learning model, according to some embodiments of the disclosure. This machine learning model can differentiate between vulnerable and non-vulnerable (vanilla) code snippets. In some embodiments, the process includes several steps, including the described earlier creation of vulnerable and vanilla datasets, vectorization of the code, model training, and the final model creation.

In block 302, the process creates a dataset of vulnerable code snippets. As explained above, these snippets are typically extracted from known vulnerabilities, such as those listed in the Common Vulnerabilities and Exposures (CVE) database. The vulnerable code snippets represent coding errors that have led to security issues in the past. In block 304, the process also creates a dataset of vanilla, or non-vulnerable, code snippets. These snippets are typically extracted from open-source projects and have been vetted to ensure they do not contain any known vulnerabilities. The vanilla code snippets represent clean, secure code.

In block 306, the code snippets of the vulnerable dataset are converted into a format that can be understood by a machine learning model, for example, vectorization. This vectorization process includes transforming the text-based code snippets into numerical vectors. Various known techniques can be used for the vectorization process, such as bag-of-words, TF-IDF, or word embeddings like Word2Vec or GloVe and others. In block 308, the vanilla code snippets are also vectorized. Similar vectorization technique may be used for the vanilla code snippets to ensure consistency. The vectorization process is irreversible and thus in further processing no publicly available source code snippets are used nor do they get embedded during training into Machine Learning model.

Once the code snippets have been vectorized, they are used to train a machine learning model 312, in block 310. Various types of models can be used for this purpose, including neural networks, XGBoost, or other types of classifiers. The choice of machine learning model 312 depends on the specific implementation. During the training process, the model learns to differentiate between and classify the vectorized representations of the vulnerable and vanilla code snippets. For instance, for neural network that performs logistic regression in its final layer, the network returns probability function $$P(y=1 \mid x; w) = \frac{1}{1+e^{-w^{T}x}},$$

where y is the true label of the sample (y∈0,1, where 0 is vanilla and 1 vulnerable), x is the vector representation of the code snippet and w are the network weights of the logistic regression model.

This way, the machine learning model 312 has been trained to differentiate between vulnerable and vanilla code snippets and can be used to analyze new code snippets and predict their vulnerability status. The model can be saved and deployed in a variety of environments, depending on the specific use case, which makes it a valuable tool for identifying and addressing potential vulnerabilities in software code.

Figure 4:
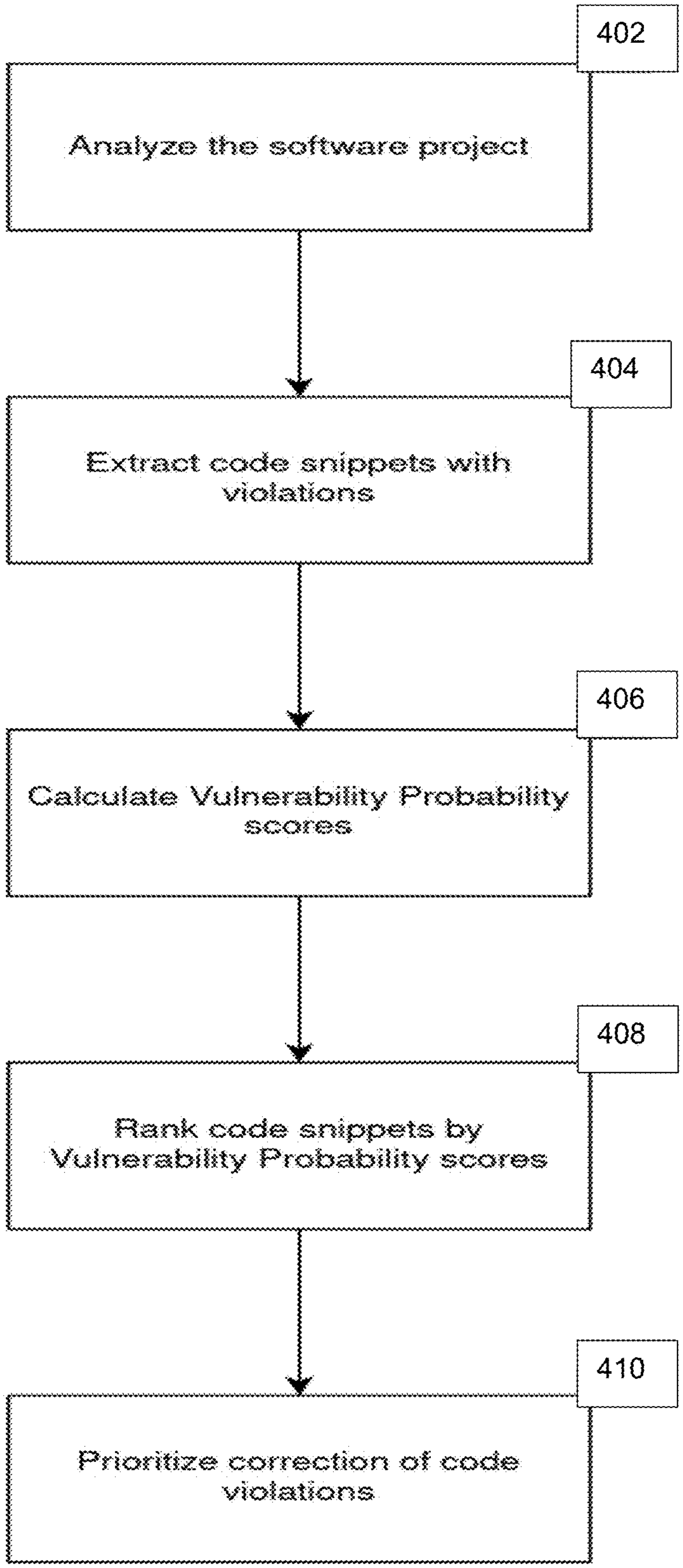
FIG. 4 shows a process for prioritizing code violations using a trained machine learning model, according to some embodiments of the disclosure.

FIG. 4 shows a process for prioritizing code violations using a trained machine learning model, according to some embodiments of the disclosure. Once the machine learning model has been trained on the "vulnerable" and "vanilla" datasets, it can be used to prioritize code violations given software project. As shown in block 402, the software project for code violations is analyzed for code violations. This can be done using various static analysis tools, such as Parasoft's C/C++test, Jtest, and dotTest, which can identify a wide range of issues, including coding standard violations, potential security vulnerabilities, and other types of defects.

In block 404, the code (snippets) containing violations are extracted from the software project. These snippets represent the portions of the codebase that require attention and potential correction. In block 406, the extracted code snippets are input to the trained machine learning model, which assigns and outputs a "vulnerability probability" score to each snippet. This score measures the code snippet's similarity to verified vulnerability-causing mistakes, thus indicating the severity of the violation. For example, a violation happening in the user input data parsing function is more dangerous than the one that happens in the code that parses configuration files. The former violation might be exploited remotely while the latter violation requires local machine access with appropriate privileges. The machine learning model recognizing the function similarity to other vulnerable functions (that by the vulnerable dataset construction were exploitable) assigns higher vulnerability probability to the user input data parsing function thus prioritizing its fix over the instance that is less severe.

In block 408, the code snippets are ranked based on their vulnerability probability scores, with higher scores indicating a higher likelihood of causing severe vulnerabilities. The process utilizes the probability score to rank (prioritize) violations to fix, in bock 410. By addressing the most critical issues first, organizations can optimize their resources, ensuring that the riskiest violations are fixed in the first place. For example, an organization might mandate a certain vulnerability probability score, e.g., 50% as a threshold and require fixing only violations in code snippets with vulnerability probability score higher than that therefore reducing the number of violations required to be fixed while ensuring the most critical violations are being addressed.

In some embodiments, once the code snippets are ranked (ordered) based on their vulnerability probability scores, the system executes an error correction process to fix all or some of those violations. For example, the user can select (i.e., an input to the system) to correct a certain number of errors from the top of the ranked list, top 15% of the errors in the list, or errors within a window of their vulnerability probability scores. In some embodiments, once the system corrects the selected code violation, it may prompt the user to select another batch of code violations to be fix by the system.

As known in the art, the above process may be executed on a desktop computer or on one or more remote servers. Also, the processes may be stored on a tangible storage device to be accessed and executed by one or more computers.

In conclusion, the process of prioritizing code violations using the trained machine learning model provides a more efficient and effective method for addressing code violations in a software project. By focusing on the most critical issues first, developers can optimize their time and resources, enhancing the security and overall quality of the software application. By mandating a certain vulnerability probability score, e.g. 50% as a threshold, a company might reduce the number of violations required to be fixed while ensuring the most critical violations are being addressed.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for prioritizing code violations in a computer program, using machine learning, the method comprising:
analyzing the computer program for the code violations;
extracting one or more first code snippets containing the code violations from the computer program;
training a machine learning model based on a vulnerable dataset and a non-vulnerable dataset to differentiate between vulnerable and non-vulnerable code in the one or more first code snippets, wherein the non-vulnerable dataset is generated based on identifying code samples and removing one or more second code snippets having the code violations from the code samples;
inputting the one or more first code snippets to a trained machine learning model to assign a vulnerability probability score to each of the one or more first code snippets, wherein each vulnerability probability score indicates a severity of a violation of the code violations for a respective first code snippet;
ranking the one or more first code snippets based on their respective vulnerability probability score, wherein a higher score indicates a higher likelihood of causing severe vulnerabilities; and
displaying the one or more first code snippets to be fixed for the code violations according to the ranking.

2. The method of claim 1, wherein the vulnerable dataset is created from commit hashes found in the Common Vulnerabilities and Exposures (CVE).

3. The method of claim 1, wherein the vulnerable dataset includes unique CVE identifier, a description of a vulnerability, a vulnerability potential impact, and references to related reports.

4. The method of claim 1, wherein the non-vulnerable dataset is created from open source projects using static analysis tools.

5. The method of claim 2, wherein creating the vulnerable dataset comprises:
downloading a CVE dataset;
filtering entries in the CVE dataset to identify entries that contain commit hashes;
downloading corresponding patches for the commit hashes;
identifying code in the computer program that was affected by each patch;
reversing each patch in the identified code to restored code in the computer program that was affected by each patch to its pre-patch state;
determining vulnerable files that contain the code violations; and
extracting vulnerable code snippets from the vulnerable files.

6. The method of claim 4, wherein creating the non-vulnerable dataset comprises:
downloading corpora of open-source (OS) projects from an OS project;
analyzing the computer program using a code violation testing tool to identify the code violations;
removing one or more first functions and methods that are identified with the code violations; and
creating a non-vulnerable functions and methods dataset including one or more second functions or methods that do not contain the code violations from analyzing the computer program.

7. The method of claim 1, wherein the code violations include security vulnerabilities.

8. A system for prioritizing code violations in a computer program, using machine learning comprising:
means for analyzing the computer program for the code violations;
means for extracting one or more first code snippets containing the code violations from the computer program;
means for training a machine learning model based on a vulnerable dataset and a non-vulnerable dataset to differentiate between vulnerable and non-vulnerable code in the one or more first code snippets, wherein the non-vulnerable dataset is configured to be generated based on identifying code samples and removing one or more second code snippets having the code violations from the code samples;
means for inputting the one or more first code snippets to a trained machine learning model to assign a vulnerability probability score to each of the one or more first code snippets, wherein each vulnerability probability score indicates a severity of a violation of the code violations for a respective code snippet;
means for ranking the one or more first code snippets based on their respective vulnerability probability score, wherein a higher score indicates a higher likelihood of causing severe vulnerabilities; and
means for displaying the one or more first code snippets to be fixed for the code violations according to the ranking.

9. The system of claim 8, wherein the vulnerable dataset is created from commit hashes found in the Common Vulnerabilities and Exposures (CVE).

10. The system of claim 8, wherein the vulnerable dataset includes unique CVE identifier, a description of a vulnerability, a vulnerability potential impact, and references to related reports.

11. The system of claim 8, wherein the non-vulnerable dataset is created from open-source projects using static analysis tools.

12. The system of claim 9, wherein means for creating the vulnerable dataset comprises:

means for downloading a CVE dataset;
means for filtering entries in the CVE dataset to identify entries that contain commit hashes;
means for downloading corresponding patches for the commit hashes;
identifying code in the computer program that was affected by each of the patches;
means for reversing each of the patches in the identified code to restored code in the computer program that was affected by each of the patches to its pre-patch state;
means for determining vulnerable files that contain the code violations; and
means for extracting vulnerable code snippets from the vulnerable files.

13. The system of claim 11, wherein means for creating the non-vulnerable dataset comprises:
means for downloading corpora of open-source (OS) projects from an OS project;
analyzing the computer program using a code violation testing too to identify the code violations;
means for removing one or more first functions and methods that are identified with the code violations; and
means for creating a non-vulnerable functions and methods dataset including one or more second functions or methods that do not contain the code violations from analyzing the computer program.

14. The system of claim 9, wherein the code violations include security vulnerabilities.

15. A non-transitory tangible storage medium for storing a plurality of computer codes, the plurality of computer codes when executed by one more computers performing a method for prioritizing code violations in a computer program, using machine learning, the method comprising:
analyzing the computer program for the code violations;
extracting one or more first code snippets containing the code violations from the computer program;
training a machine learning model based on a vulnerable dataset and a non-vulnerable dataset to differentiate between vulnerable and non-vulnerable code in the one or more first code snippets, wherein the non-vulnerable dataset is generated based on identifying code samples and removing one or more second code snippets having the code violations from the code samples;
inputting the one or more first code snippets to a trained machine learning model to assign a vulnerability probability score to each of the one or more first code snippets, wherein each vulnerability probability score indicates a severity of a violation of the code violations for a respective first code snippet;
ranking the one or more first code snippets based on their respective vulnerability probability score, wherein a higher score indicates a higher likelihood of causing severe vulnerabilities; and
displaying the one or more first code snippets to be fixed for the code violations according to the ranking.

16. The non-transitory tangible storage medium of claim 15, wherein the vulnerable dataset is created from commit hashes found in the Common Vulnerabilities and Exposures (CVE).

17. The non-transitory tangible storage medium of claim 15, wherein the non-vulnerable dataset is created from open-source projects using static analysis tools.

18. The non-transitory tangible storage medium of claim 16, wherein creating the vulnerable dataset comprises:
downloading a CVE dataset;
filtering entries in the CVE dataset to identify entries that contain commit hashes;
downloading corresponding patches for the commit hashes;
identifying code in the computer program that was affected by each of the patches;
reversing each of the patches in the identified code to restored code in the computer program that was affected by each of the patches to its pre-patch state;
determining vulnerable files that contain the code violations; and
extracting vulnerable code snippets from the vulnerable files.

19. The non-transitory tangible storage medium of claim 17, wherein creating the non-vulnerable dataset comprises:
downloading corpora of open-source (OS) projects from an OS project;
analyzing the computer program using a code violation testing tool to identify the code violations;
removing one or more first functions and methods that are identified with the code violations; and
creating a non-vulnerable functions and methods dataset including one or more second functions or methods that do not contain the code violations from analyzing the computer program.

20. The non-transitory tangible storage medium of claim 15, wherein the code violations include security vulnerabilities.

* * * * *